J. C. LINDER.
ANIMAL-TRAP.

No. 177,728. Patented May 23, 1876.

Witnesses
Chas. A. Hague.
T. Z. Ingersoll.

Inventor
John C Linder
By R. D. Ingersoll.
atty

UNITED STATES PATENT OFFICE.

JOHN C. LINDER, OF CHICAGO, ILLINOIS.

IMPROVEMENT IN ANIMAL-TRAPS.

Specification forming part of Letters Patent No. 177,728, dated May 23, 1876; application filed December 13, 1875.

*To all whom it may concern:*

Be it known that I, JOHN C. LINDER, of Chicago, in the county of Cook and State of Illinois, have invented a new and useful Improvement in Animal-Traps; and I hereby declare the following to be a full, clear, and exact description thereof, which will enable others skilled in the art to which my invention relates to make and use the same, reference being had to the accompanying drawing, forming part of this specification, in which—

Figure 1:
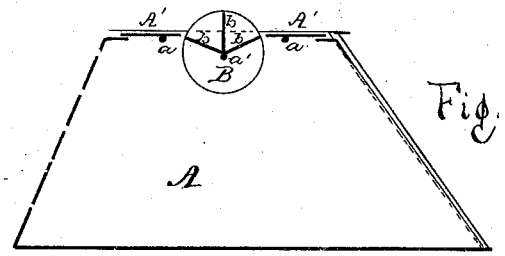
Figure 2:
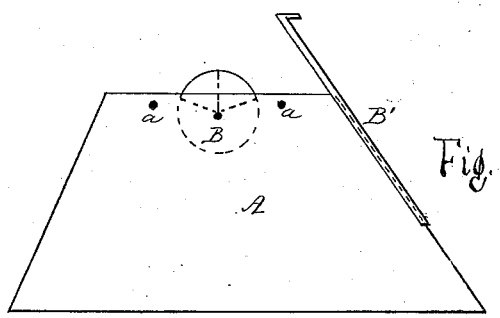
Figure 3:
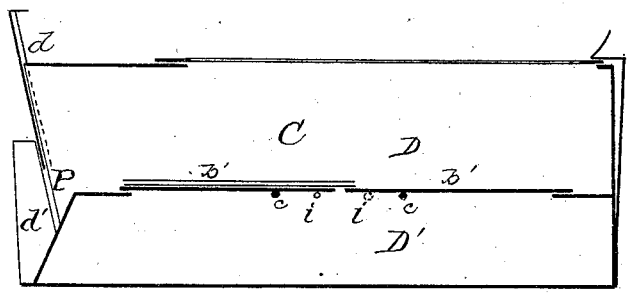
Figure 4:
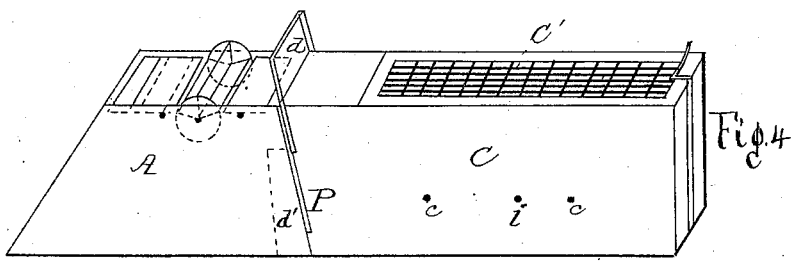

Figure 1 is a cross-section of trap; Fig. 2, a side view of trap; Fig. 3, a longitudinal section of the receptacle to the trap, and Fig. 4 a perspective view of the trap and receptacle when attached together.

My invention relates to self-setting animal-traps, and consists in the peculiar construction of the same.

The object of my invention is to furnish the public with a cheap and efficient animal-trap that will contain a large number of animals when adjusted for that purpose, and also, where there are only a few animals, one portion of the trap can be removed and yet the remaining part will be as efficient as ever.

Where animals are caught for their fur or other valuable purposes, it is desirable to secure as many as possible at the first setting of the trap, for, in some cases, after a very few have been secured, the remaining ones become shy and will not approach the trap again.

In the traps that are in use at the present time there can be but a small number of animals secured without increasing the cost of the trap a great deal, as the material is quite expensive and it requires a large amount of valuable time to construct the same, while my improved trap is of less expensive material, requires very little time in its construction and is simple in all its parts, as I will proceed to explain.

In the accompanying drawing, A represents the trap provided with the tilting platforms A' secured to the wires $a$. The ends of the wires pass through the sides of the trap and form journals for the platforms to vibrate on. Between the tilting platforms A' is the bait-holder B, hung upon the journals $a'$, and provided with one or more wings, $b$. B' is a door through which the contents of the trap are removed. C is a receptacle provided with two apartments, D and D'. The floor of the upper apartment is provided with tilting platforms $b'$ hung upon wires, the ends of which pass through the sides of the receptacle at $c$, and form journals on which the platforms vibrate when required. C', is a screen-door in the top of the receptacle, through which the contents are removed. $d$ is a door in the end of the receptacle, closing the entrance to the same. $d'$ are extensions on each side of the receptacle, provided with the slots P, into which the door slides to close the approach to the inside of the same. When the trap and receptacle are connected, the receptacle-door is withdrawn far enough to allow the door B' of the trap to enter the same slots.

The operation of my invention is as follows: When a person desires to operate with the trap, he places the bait upon the bait-holder B and secures it in the proper manner. When the animal approaches the same the inner edge of the platform upon which he stands tilts downward and the bait-holder revolves far enough to allow the animal to pass through into the trap. The outer edge of the platform and the under side of the bait-holder being heavier than the opposite portions they immediately return to their former position and are ready for the next animal that approaches. If the receptacle is attached to the trap, the animals pass into the apartment D, and if it is desired to let them from the trap alive, the receptacle is removed from the trap and the animal allowed to pass out through the doorway $d$ in the end of the receptacle. Should the operator desire to kill the animals, he draws out the wire $i$, which allows the platforms or doors $b'$ to tilt downward and precipitate the contents into the lower apartment. The doors then close and the receptacle is immersed in water. When the contents are to be removed, the platform $b'$ is drawn out through a slot in the side of the receptacle, the screen-door C' is opened and the carcasses ejected through the same.

Having thus described my invention, what I claim as new and desire to secure by Letters Patent is—

In combination with the trap A having the tilting platforms, the receptacle C, provided with the apartments D and D', tilting doors or platforms $b'$, wire $i$, slots P, door C', and the door $d$, constructed and arranged to operate substantially as and for the purpose specified and described.

The above specification signed by me this 9th day of December, 1875.

JOHN C. LINDER.

Witnesses:
R. D. INGERSOLL,
T. Z. INGERSOLL.